United States Patent Office 3,388,152
Patented June 11, 1968

3,388,152
POLYENE GLYCOLS AND ACETOXY-POLYENE GLYCOLS BY PINACOLIC REDUCTION OF POLYENE ALDEHYDES
Albert J. Reedy, Rochester, N.Y., assignor to Eastman Kodak Company, Rochester, N.Y., a corporation of New Jersey
No Drawing. Filed Aug. 24, 1964, Ser. No. 391,743
11 Claims. (Cl. 260—488)

ABSTRACT OF THE DISCLOSURE

Polyene aldehydes, such as, for example, retinal or sorbaldehyde, are reduced to the corresponding pinacol by contact with activated zinc in a reaction medium of pyridine or an alkylpyridine. The polyene α-glycols resulting from the pinacolic reduction are useful as intermediates in the synthesis of carotenoids.

This invention relates to the chemical arts. More particularly, it relates to polyene α-glycols and to their synthesis.

This invention is based on the discovery of new polyene α-glycols obtained by the pinacolic reduction of certain polyene aldehydes by contacting the polyene aldehydes with an active zinc material in certain amine solvents.

In summary this invention comprises polyene α-glycols represented by the formula:

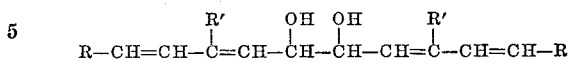

wherein R is a radical selected from the group consisting of saturated and unsaturated, aliphatic and substituted aliphatic radicals and R' is a radical selected from the group consisting of methyl and hydrogen radicals. Examples of polyene α-glycols according to the formula include:

(1) retinal pinacol (di - [8 - (2,6,6 - trimethylcyclohex - 1 - enyl) - 2,6 - dimethyl octa - 1,3,5,7 - tetraeneyl] ethylene glycol) whose structural formula is as follows:

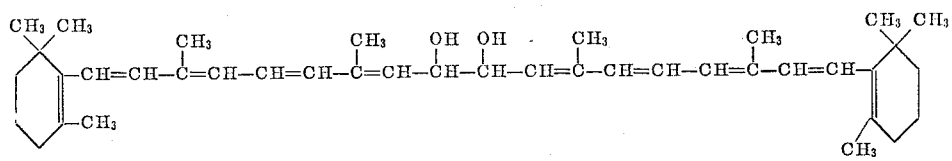

(2) 13-cis retinal pinacol whose structural formula is as given immediately above except that the double bond from the 13-position carbon atom is in the cis configuration, (3) 3,4 - dehydroretinal pinacol (di - [8 - (2,6,6 - trimethylcyclohexa - 1,3 - dienyl) - 2,6 - dimethyl octa-1,3,5,7-tetraeneyl] ethylene glycol) whose structural formula is as follows:

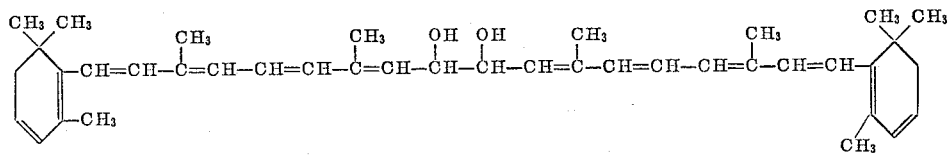

(4) 4 - acetoxy - retinal pinacol di - [8 - (2,6,6 - trimethyl - 5 - acetoxycyclohex - 1 - enyl) - 2,6 - dimethyl octa-1,3,5,7-tetraeneyl] ethylene glycol) whose structural formula is as follows:

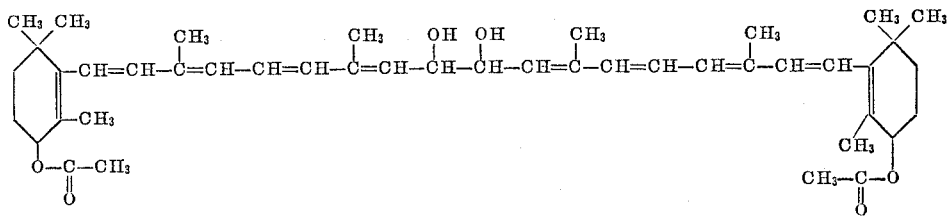

and (5) sorbaldehyde pinacol (dipenta-1,3-dienyl ethylene glycol) whose structural formula is as follows:

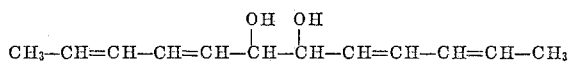

$$CH_3-CH=CH-CH=CH-\underset{|}{\overset{OH}{C}}H-\underset{|}{\overset{OH}{C}}H-CH=CH-CH=CH-CH_3$$

In general the polyene α-glycols of this invention are useful as intermediates in the synthesis of useful carotenoids. For example, retinal pinacol can be treated with posphorous triiodide to give β-carotene, a well known carotenoid used commercially to fortify foods such as margarine.

This invention also comprises a process for making polyene α-glycols. This process comprises the step of contacting a polyene aldehyde represented by the formula:

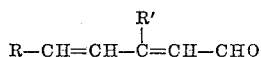

$$R-CH=CH-\underset{|}{\overset{R'}{C}}=CH-CHO$$

wherein R is a radical selected from the group consisting of saturated and unsaturated, aliphatic and substituted aliphatic radicals and R' is a radical independently selected from the group consisting of methyl and hydrogen radicals, with an active zinc material in a liquid reaction medium consisting essentially of an amine selected from the group consisting of pyridine, 4-n-alkylpyridine wherein the alkyl substituent has 1–3 carbon atoms, 3-methylpyridine, and mixtures thereof.

Polyene aldehydes represented by the foregoing formula are readily available compounds. Examples of such compounds include:

Retinal
13-cis retinal
3,4-dehydroretinal
4-acetoxy retinal
Sorbaldehyde

Active zinc material in general consists essentially of metallic zinc. Examples of active zinc material include zinc, zinc amalgam, zinc bismuth, zinc-copper, and the like. Active zinc material is obtained, for example, by washing zinc alone with a strong mineral acid and water and by treatment of zinc with mercury or a solution of salts of another metal such as mercury, copper and bismuth.

Mole ratio of active zinc material to the polyene aldehyde in the process of this invention is generally at least about 1:1 and preferably in a range from about 1:1 to about 3:1 with 2:1 being usually about the optimum. Mole ratios less than 1:1 result generally in little or no reaction. Mole ratios greater than 3:1 are within the concepts of this invention inasmuch as generally they do not appear to have an adverse effect. However, for at least economy reasons a mole ratio of about 3:1 is a practical maximum.

The liquid reaction medium appears to be critical to the reaction. The amines listed are amines in which the desired reaction goes. Reaction does not appear to go in such amines as 2-picoline and 2,4-lutidine.

The quantity of liquid reaction medium employed in carrying out the contacting step is in general in a range from about 2 to about 5 times the volume of polyene aldehyde. This range usually includes a quantity of liquid reaction medium in a range from about 1 to about 10 milliliters per gram of polyene aldehyde, in which range particularly satisfactory results have been obtained. Quantities less than about 2 volumes are within the concepts of this invention but in general the lesser the quantity of liquid reaction medium the more difficult handling (stirring, pouring and the like) of the reaction mixture becomes.

Temperature at which contacting of the polyene aldehyde with active zinc material in one of the selected amine solvents is performed is in general in a range from about 0 to about 75° C. and preferably within a range from about 10 to about 50° C.

The period of time for carrying out the contacting step is generally in a range from about 1 to about 24 hours. However, greater and lesser times are within the concepts of this invention.

Normally, the contacting step is carried out at atmospheric pressure. However, it can be performed at ambient pressures greater or smaller than atmospheric pressure. The lower limit however is the volatilization point of the liquid reaction medium or of the polyene aldehyde, whichever is the higher.

In general the contacting step is performed by adding to the liquid reaction medium the polyene aldehyde and the active zinc material, and stirring the resulting reaction mixture for the desired period of time.

After the desired period of time for carrying out the step, the reaction mixture is preferably treated to remove the active zinc material from the liquid reaction medium. This is done by filtration of the reaction mixture and extraction with a solvent such as diethyl ether.

This invention is further illustrated by the following examples of various aspects of the invention including specific embodiments thereof. This invention is not limited to these specific embodiments unless otherwise indicated.

Example 1

This example illustrates the synthesis of retinal pinacol from retinal with zinc amalgam as the active zinc material and pyridine as the liquid reaction medium.

5 grams (0.0176 mole) of retinal is dissolved in 10 milliliters of dry pyridine. The resulting solution is shaken with 10 grams (0.143 mole of Zn) of zinc amalgam [$Zn(Hg)_x$], made by contacting zinc with an aqueous solution of a mercuric salt, the weight ratio of mercuric ion to zinc being 1:38, for 2.5 hours at 20–25° C. 100 milliliters of diethyl ether are added to the resulting reaction mixture and thereafter the ether diluted reaction mixture is filtrated through a sintered glass funnel packed with an inert filler-aid such as Celite material. The filter-aid is washed with 100 milliliters of diethyl ether and the combined ether fractions are washed successively with 10% sulfuric acid, 0.5 N potassium hydroxide and water. After drying the washed, ether solution over anhydrous sodium sulfate, the diethyl ether is removed by evaporation. The resulting product consists essentially of retinal pinacol. A typical yield of the product is 4.92 grams. A typical ultraviolet light absorption value is E (1%, 1 cm., ethanol)(325 mμ)=1204. Yield of the retinal pinacol is calculated by multiplying the number of grams of recovered material times E (1%, 1 cm., ethanol)(325 mμ) value multiplied by 100 divided by the number of grams of input material times the E (1%, 1 cm., ethanol)(325 mμ) value of 1,280, which is the highest ultraviolet light absorption value found for a sample of retinal pinacol purified by chromatography. Under the foregoing conditions the yield of retinal pinacol is typically 92%. The presence of a vicinal dihydroxy moiety and the absence of an aldehyde group in the product can be established by infrared absorption. Typically there is no retinal in the product as can be established by a vitamin A rat liver storage bioassay (no vitamin A activity).

Example 2

This example illustrates the utility of retinal pinacol in the synthesis of retinal pinacol diacetate.

1 gram (0.00175 mole) of retinal pinacol synthesized according to the procedure of Example 1 is converted to retinal pinacol diacetate by admixture with 1 milliliter (0.0106 mole) of acetic anhydride in 1 milliliter of pyridine at 20–25° C. for 1 hour and then at 60° C. for 15 minutes. The resulting reaction mixture is taken up in diethyl ether and the ether solution washed successively with dilute sulfuric acid, 0.5 N KOH and water. The washed ether solution is dried over anhydrous sodium sulfate and then the diethyl ether is evaporated away. The product which remains consists essentially of retinal pinacol diacetate. A typical ultraviolet light absorption value for the product is E (1%, 1 cm., ethanol) (325 m$\mu$)=978. The presence of acetate groups and the absence of hydroxyl groups is readily established by infrared absorption analysis.

Example 3

This example illustartes another utility of retinal pinacol in the synthesis of retinal pinacol dimethyl ether.

2 grams (0.0035 mole) of retinal pinacol made as by the procedure of Example 1 are dissolved in 30 milliliters of acetone and treated with 5 milliliters (0.08 mole) of methyl iodide and 2.0 grams (0.036 mole) of finely pulverized potassium hydroxide. The mixture is refluxed with stirring for 50 minutes, diluted with 150 milliliters of diethyl ether and washed with water. It is then dried over anhydrous sodium sulfate. The ether solvent is then evaporated. The residue is the desired product which consists essentially of retinal pinacol diamethyl ether. A typical ultraviolet light absorption value of the product is E (1%, 1 cm., ethanol)(325 m$\mu$)=750. The presence of ether groups and the absence of hydroxy groups can be confirmed by infrared absorption analysis.

Example 4

This example illustrates the utility of retinal pinacol in the synthesis of $\beta$-carotene.

1 gram (0.00175 mole) of retinal pinacol having a typical ultraviolet light absorption value E (1%, 1 cm., chloroform)(325 m$\mu$)=1190, is dissolved in 30 milliliters (0.50 mole) of carbon disulfide containing 0.3 milliliter of pyridine and cooled to 0° C. 0.5 gram (0.0012 mole) of phosphorous triiodide is added over a 15 minute period to the solution with stirring. The resulting mixture is stirred at 0° C. for 2.5 hours and then allowed to warm to room temperature (20–25° C.). The reaction mixture is diluted with 150 milliliters of diethyl ether and washed successively with 10% sulfuric acid, 0.5 N potassium hydroxide and water. The washed solution is dried over anhydrous sodium sulfate and then the diethyl ether is evaporated therefrom to give a product consisting essentially of $\beta$-carotene. A typical ultraviolet light absorption value for the product is E (1%, 1 cm., chloroform)(462 m$\mu$)=870, which represents a yield of $\beta$-carotene of about 38%. The reaction product can be purified by chromatography on alumina. A typical ultraviolet light absorption value of the purified product is E (1%, 1 cm. chloroform)(463 m$\mu$)=1762.

Example 5

This example illustrates the utility of retinal pinacol in the synthesis of dehydroretrocarotene.

5 grams (0.00875 mole) of retinal pinacol is dissolved in 100 milliliters of diethyl ether. The resulting solution is shaken at room temperature for 3 minutes with 20 milliliters of concentrated hydrochloric acid. The ether layer is separated and washed successively with 0.5 N potassium hydroxide and water. After drying over anhydrous sodium sulfate, the ether solution is then subjected to evaporation to remove the diethyl ether. The product remaining after the evaporation step consists essentially of dehydroretrocarotene. A typical ultraviolet light absorption value of the product is E (1%, 1 cm., chloroform) (478 m$\mu$)=1140 representing a yield of 38%.

The product is dissolved in a small volume of petroleum ether (such as Skellysolve B) and chromatographed on alumina. The eluate obtained in the chromatographic procedure is evaporated and the residue crystallized first from ether-methanol and then from chloroform-methanol. A typical melting point of the crystallized material is 184–185° C. and a typical ultraviolet light absorption value is E (1%, 1 cm., chloroform) (483 m$\mu$)=2855. Confirmation that the crystal material is a hydrocarbon with a "retro" conjugated double bond system can be obtained by infrared absorption analysis.

Example 6

This example illustrates the synthesis of retinal pinacol from 13-cis retinal with zinc amalgam as the active zinc material and pyridine as the liquid reaction medium.

1 gram (0.0035 mole) of 13-cis retinal is dissolved in 2 milliliters of dry pyridine. 2 grams (0.029 mole of Zn) of zinc amalgam, made as indicated in Example 1, are added to the solution and the resulting mixture is shaken for 20 hours at room temperature (20–25° C.). The resulting reaction mixture is admixed with 100 milliliters of diethyl ether and then filtered through a sintered glass funnel packed with inert filter-aid. The filter-aid is washed with 100 milliliters of ether and the filtered solution and wash fraction are combined, washed successively with 10% sulfuric acid, 0.5 N potassium hydroxide and water. After drying the washed solution over anhydrous sodium sulfate, the diethyl ether is evaporated therefrom. The resulting product consists essentially of retinal pinacol. A typical ultraviolet light absorption value is E (1%, 1 cm., ethanol) (325 m$\mu$)=1163 representing a yield of 91%. The presence of a vicinal dihydroxy moiety and the absence of an aldehyde group can be confirmed by infrared absorption analysis.

Example 7

This example illustrates the synthesis of retinal pinacol from retinal with zinc amalgam as the active zinc material and 4-picoline as the liquid reaction medium.

2 grams (0.007 mole) of retinal are dissolved in 4 milliliters of 4-picoline. The resulting solution is admixed with 4 grams (0.058 mole of Zn) of zinc amalgam (made as in Example 1) and the resulting mixture is shaken for 3 hours at room temperature. The reaction mixture thus formed is diluted with 100 milliliters of diethyl ether and filtered through inert filter-aid. The filter-aid is washed with 100 milliliters of ether and the wash liquid combined with the filtrate. The resulting ether solution is washed successively with 10% sulfuric acid, 0.5 N potassium hydroxide and water. The washed ether solution is then dried over anhydrous sodium sulfate followed by evaporation of the diethyl ether. The resulting product consists essentially of retinal pinacol. A typical ultraviolet light absorption value of the product is E (1%, 1 cm., ethanol) (325 m$\mu$)=1160 which represents a yield of 91%.

Example 8

This example illustrates the synthesis of retinal pinacol from retinal with zinc-bismuth as the active zinc material and pyridine as the liquid reaction medium.

1 gram (0.0035 mole) of retinal is dissolved in 10 milliliters of dry pyridine. The resulting solution is admixed with 2 grams (0.03 mole of zinc) of zinc bismuth [Zn(Bi)] made by contacting zinc with an aqueous solution of a bismuth salt wherein the weight ratio of bismuth ion to zinc is about 1:69. The resulting mixture is shaken for 20 hours at 20–25° C. The reaction mixture which results is diluted with 100 milliliters of diethyl ether and is filtered through a sintered glass funnel packed with inert filter aid. The filter aid is washed with 100 milliliters of diethyl ether and the wash liquid combined with the filtrate. The filtrate is then washed successively with 10% sulfuric acid, 0.5 N potassium hydroxide and water. The washed ether solution is then dried over anhydrous sodium sulfate and the diethyl ether is removed by evaporation. The resulting product consists essentially of retinal pinacol. A typical yield of the product is 0.892 gram. A typical ultraviolet light absorption value of the product is E (1%, 1 cm., ethanol) (325 mµ)=1122, representing a yield of 78%.

Example 9

This example illustrates the synthesis of retinal pinacol from retinal using zinc dust as the active zinc material and pyridine as the liquid reaction medium.

2 grams (0.007 mole) of retinal are dissolved in 5 milliliters of dry pyridine. The solution thus formed is admixed with 4 grams (0.058 mole) of zinc dust and the mixture is shaken for 20 hours at 20–25° C. The resulting reaction mixture is admixed with 100 milliliters of diethyl ether and the ether solution is then filtered through a sintered glass funnel packed with inert filter aid. The filter aid is washed with 100 milliliters of diethyl ether and the wash liquid is combined with the filtrate. The filtrate is washed successively with 10% sulfuric acid, 0.5 N potassium hydroxide and water. After drying the washed solution over anhydrous sodium sulfate, the diethyl ether is removed by evaporation to give a reaction product consisting essentially of retinal pinacol. A typical ultraviolet light absorption value of the reaction product is E (1%, 1 cm., ethanol) (338 mµ)=842, thus indicating the reaction product also comprises unreacted aldehyde. The reaction product is purified by chromatographing it on a column of sodium aluminum silicate adsorbent (such as the Doucil product). Typically a strongly adsorbed fraction is obtained. A typical yield of this fraction is 0.53 gram. It has a typical ultraviolet light absorption value of E (1%, 1 cm., ethanol) (325 mµ)=1040, representing a yield of 21%. Confirmation of the presence of a vicinal dihydroxy moiety and the absence of an aldehyde group can be established by an infrared absorption analysis.

Example 10

This example illustrates the synthesis of retinal pinacol from retinal using zinc-copper as the active zinc material and pyridine as the liquid reaction medium.

3 grams (0.0105 mole) of retinal are dissolved in 6 milliliters of dry pyridine. 6 grams (0.089 mole of Zn) of zinc-copper, made by contacting zinc with an aqueous solution of a cupric salt wherein the weight ratio of cupric ion to zinc is 1:38, are added to the solution. The resulting mixture is shaken for 3 hours at 20–25° C. The resulting reaction mixture is admixed with 100 milliliters of diethyl ether and the mixture is filtered through a sintered glass funnel packed with inert filter aid. The filter aid is washed with 100 milliliters of diethyl ether and the wash liquid is combined with the filtrate. The filtrate is washed successively with 10% sulfuric acid, 0.5 N potassium hydroxide and water. The washed filtrate is dried over anhydrous sodium sulfate and then the ether is evaporated therefrom, giving a crude product consisting essentially of retinal pinacol. A typical ultraviolet light absorption value of the crude product is E (1%, 1 cm., ethanol) (325 mµ)=1109, representing a yield of 87%. Confirmation of the presence of a vicinal dihydroxy moiety and the absence of an aldehyde group can be established by infrared absorption analysis.

Example 11

This example illustrates the preparation of 3,4-dehydroretinal pinacol using zinc amalgam as the active zinc material and pyridine as the liquid reaction medium.

1.4 grams (0.005 mole) of 3,4-dehydroretinal, a typical ultraviolet light absorption value of which is E (1%, 1 cm., ethanol) (393 mµ)=1200, are dissolved in 8 milliliters of dry pyridine. 3 grams (0.043 mole of Zn) of zinc amalgam, made as in Example 1, are admixed with the solution and the resulting mixture is shaken for 1½ hours at 20–25° C. At the end of this time, the reaction mixture is typically a semi-solid mass. As much of the organic material as possible is separated mechanically from the zinc amalgam and transferred to a separatory funnel. 100 milliliters of diethyl ether are added to the organic material. The resulting slurry is washed with 10% sulfuric acid, 0.5 N potassium hydroxide and water. The washed slurry is dried over anhydrous sodium sulfate and the ether is then evaporated therefrom. The product thus obtained consists essentially of 3,4-dehydroretinal pinacol. A typical yield of the reaction product is 1.0 gram and a typical ultraviolet light absorption value is E (1%, 1 cm., ethanol) (352 mµ)=1050, representing a yield of 57%.

Example 12

This example illustrates the synthesis of 4-acetoxyretinal pinacol with zinc amalgam as the active zinc material and pyridine as the liquid reaction medium.

1.7 grams (0.005 mole) of 4-acetoxy retinal, synthesized as by treatment of retinal first with N-bromosuccinimide and then with acetic acid and N-ethylmorpholine, having a typical ultraviolet light absorption value of E (1%, 1 cm., ethanol) (373 mµ)=1114 are dissolved in 5 milliliters of dry pyridine. The resulting solution is admixed with 3.5 grams (0.05 mole of Zn) of zinc amalgam, made as in Example 1, and then placed on a shaker for 20 hours at 20–25° C. The mixture thus obtained is admixed with 100 milliliters of diethyl ether and filtered through a sintered glass funnel packed with an inert filter aid. After washing the filter aid with 100 milliliters of diethyl ether and combining the wash liquid with the filtrate, the filtrate is washed successively with 10% sulfuric acid, 0.5 N potassium hydroxide and water. The washed filtrate is dried over anhydrous sodium sulfate and then the ether is removed by evaporation. The result is a crude product consisting essentially of 4-acetoxyretinal pinacol. A typical yield of the crude product is 1.5 grams and a typical ultraviolet light absorption value of E (1%, 1 cm., ethanol) (325 mµ)=857, representing a yield of the desired compound of 60%. Confirmation of the presence of a vicinal dihydroxy moiety and acetate group, and the absence of an aldehyde group in the product can be confirmed by infrared absorption analysis.

Example 13

This example illustrates the synthesis of sorbaldehyde pinacol with zinc amalgam as the active zinc material and pyridine as the liquid reaction medium.

4.5 grams (0.047 mole) of sorbaldehyde are dissolved in 10 milliliters of dry pyridine. To the resulting solution are added 10 grams (0.143 mole of Zn) of zinc amalgam made as in Example 1. The mixture is then shaken for 2 hours at 20–25° C. Typically after 1 hour of shaking the mixture will gel into a semi-solid mass. At the end of two hours the reaction mixture thus formed is diluted with 100 milliliters of diethyl ether and then washed successively with 10% sulfuric acid, 0.5 N potassium hydroxide and water. The ether solution is then dried over anhydrous sodium sulfate and the ether is then removed therefrom by evaporation. The residue is a reaction product consisting essentially of sorbaldehyde pinacol. A typical yield of the reaction product is 3.84 grams and a typical ultraviolet light absorption value is E (1%, 1 cm. ethanol) (232 mµ)=1610. Typically, the reaction product has no absorption at 271 mµ, the wavelength at which sorbaldehyde has its maximum absorption. The presence of a vicinal dihydroxy moiety can be established by infrared absorption. Typically no sorbyl alcohol forms in the reaction and this can be confirmed by attempting to distill the product at 140° C. at 12 millimeters mercury pressure. In this connection sorbyl alcohol is reported by Reichstein et al., Helv. Chim. Acta, 15, 264 (1932), to distill at 76° C. at 12 millimeters mercury pressure.

Example 14

This example illustrates the synthesis of retinal pinacol employing zinc amalgam as the active zinc material and 4-ethylpyridine as the liquid reaction medium.

1 gram (0.0035 mole) of retinal is dissolved in 2 milliliters of 4-ethylpyridine. 2 grams (0.029 mole of Zn) of zinc amalgam, made as indicated in Example 1, is added to the solution and the mixture is shaken for 18 hours at 20–25° C. 25 milliliters of diethyl ether are added to the mixture and the mixture is then filtered through a sintered glass funnel packed with inert filter aid. The filter aid is washed with 50 milliliters of diethyl ether and the wash liquid added to the filtrate. The filtrate is washed successively with 10% sulfuric acid, 0.5 N potassium hydroxide and water, and then dried over anhydrous sodium sulfate. Thereafter the diethyl ether is removed by evaporation, leaving a product which consists essentially of retinal pinacol. A typical yield of the product is 1.08 grams. A typical ultraviolet light absorption value of the product is E (1%, 1 cm., ethanol) (320 mµ)=1099, representing a yield of 86%. The presence of a vicinal dihydroxy moiety and the absence of an aldehyde group in the residue can be confirmed by infrared absorption analysis.

Example 15

This example illustrates the synthesis of retinal pinacol from retinal using as the active zinc material zinc amalgam and as the liquid reaction medium 4-n-propylpyridine.

1 gram (0.0035 mole) of retinal is dissolved in 2 milliliters of 4-n-propylpyridine. 4 grams (0.058 mole of Zn) of zinc amalgam, made as in Example 1, is added to the solution and the resulting mixture is shaken for 18 hours at 20–25° C. 25 milliliters of diethyl ether are added to the mixture. The mixture is filtered through a sintered glass funnel packed with inert filter aid. The filter aid is washed with 50 milliliters of diethyl ether and the wash liquid is combined with the filtrate. The filtrate is then washed successively with 10% sulfuric acid, 0.5 N potassium hydroxide and water. After drying the washed filtrate over anhydrous sodium sulfate, the diethyl ether is removed therefrom by evaporation. The resulting product consists essentially of retinal pinacol. A typical yield of the product is 0.95 gram and a typical ultraviolet light absorption value of the product is E (1%, 1 cm., ethanol)(365 mµ)=758. The product is dissolved in 25 milliliters of petroleum ether (Skellysolve F) and chromatographed on a sodium aluminum silicate adsorbent. In this fashion an adsorbed fraction is recovered, a typical yield being 0.312 gram and a typical ultraviolet light absorption value being E (1%, 1 cm., ethanol)(320 mµ)=802, representing a yield of 19%. The presence of a vicinal dihydroxy moiety and the absence of an aldehyde group in the chromatographed product can be confirmed by infrared analysis.

EXAMPLE 16

This example illustrates the synthesis of retinal pinacol with zinc amalgam as the active zinc material and 3-picoline as the liquid reaction medium.

1 gram (0.0035 mole) of the retinal is dissolved in 2 milliliters of 3-picoline. 10 grams (0.143 mole of Zn) of zinc amalgam, made as indicated in Example 1, are added to the resulting solution and the mixture thus obtained is shaken for 18 hours at 20–25° C. 25 milliliters of diethyl ether are added to the mixture and it is filtered through a sintered glass funnel packed with inert filter aid. The filter aid is washed with 50 milliliters of diethyl ether and the wash liquid is combined with the filtrate. The filtrate is then washed successively with 10% sulfuric acid, 0.5 N potassium hydroxide and water. The washed filtrate is dried over anhydrous sodium sulfate and then the diethyl ether is removed by evaporation. The product thus obtained consists essentially of retinal pinacol. A typical yield of the product is 0.98 gram and a typical ultraviolet light absorption value is E (1%, 1 cm., ethanol)(320 mµ)=861, which represents a yield of 67%. The presence of a vicinal dihydroxy moiety and the absence of an aldehyde group can be established by infrared absorption.

Thus there is provided a process for the synthesis in high yield of polyene α-glycols from polyene aldehydes. Moreover, there are provided new compounds of utility. The materials employed in the process of this invention as well as those employed for the synthesis of the new polyene α-glycols are readily obtained. The reaction proceeds at normal room temperatures and conventional equipment is all that is needed to practice the process.

Other features, advantages and specific embodiments of this invention will be readily apparent to those in the ordinary exercise and skill in the art after reading the foregoing disclosures. In this regard, although specific embodiments of this invention have been described in considerable detail, modifications and variations of these embodiments can be effected without departing from the spirit and scope of the invention as described and claimed.

The embodiments of the invention in which an exclusive property or privilege is claimed are defined as follows:

1. A polyene α-glycol represented by the formula:

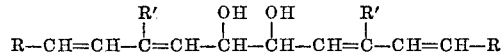

wherein R is selected from the group consisting of saturated and unsaturated, unsubstituted and acetoxy-substituted aliphatic hydrocarbon radicals, and R' is independently selected from the group consisting of methyl and hydrogen radicals.

2. Retinal pinacol.
3. 3,4-dehydroretinal pinacol.
4. 4-acetoxy-retinal pinacol.
5. Sorbaldehyde pinacol.
6. A process for effecting the pinacolic reduction of a polyene aldehyde represented by the formula:

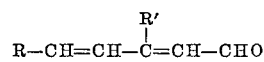

wherein R is selected from the group consisting of saturated and unsaturated, unsubstituted and acetoxy-substituted aliphatic hydrocarbon radicals, and R' is independently selected from the group consisting of methyl and hydrogen radicals, which comprises: contacting said polyene aldehyde with an active zinc material consisting essentially of metallic zinc at a mole ratio of said material to said aldehyde of at least about 1:1 in a liquid reaction medium selected from the group consisting of pyridine, 4-n-alkylpyridine wherein the alkyl substituent has 1–3 carbon atoms, 3-methylpyridine and mixtures thereof.

7. A process for effecting the pinacolic reduction of a polyene aldehyde represented by the formula:

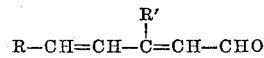

wherein R is selected from the group consisting of saturated and unsaturated, unsubstituted and acetoxy-substituted aliphatic hydrocarbon radicals, and R' is independently selected from the group consisting of methyl and hydrogen radicals, which comprises: adding to said polyene aldehyde an active zinc material consisting essentially of metallic zinc at a mole ratio of said material to said aldehyde in a range from about 1:1 to about 3:1 in a liquid reaction medium selected from the group consisting of pyridine, 4-n-alkylpyridine wherein the alkyl substituent has 1–3 carbon atoms, 3-methylpyridine and mixtures thereof, whereby a reaction mixture is formed, and agitating said reaction mixture at a temperature substantially in a range from about 0 to 75° C. for a period of time substantially in a range from about 1 to about 24 hours.

8. A process according to claim 7 wherein said polyene aldehyde is retinal.

9. A process according to claim 7 wherein said polyene aldehyde is 3,4-dehydroretinal.

10. A process according to claim 7 wherein said polyene aldehyde is 4-acetoxy retinal.

11. A process according to claim 7 wherein said polyene aldehyde is sorbaldehyde.

References Cited

UNITED STATES PATENTS 3,240,822   3/1966   Braun _____ 260—635

LORRAINE A. WEINBERGER, *Primary Examiner.*

V. GARNER, *Assistant Examiner.*